United States Patent
Hartlöhner et al.

(10) Patent No.: US 6,293,738 B1
(45) Date of Patent: Sep. 25, 2001

(54) THREAD CUTTING BIT

(75) Inventors: Rudi Hartlöhner, Tuchenbach; Hermann Prokop, Neustadt an der Aisch, both of (DE)

(73) Assignee: Kennametal PC Inc., Monrovia, CA (US)

( * ) Notice: Subject to any disclaimer, the term of this patent is extended or adjusted under 35 U.S.C. 154(b) by 0 days.

(21) Appl. No.: 09/516,873

(22) Filed: Mar. 2, 2000

Related U.S. Application Data

(63) Continuation-in-part of application No. PCT/EP98/05078, filed on Aug. 11, 1998.

(30) Foreign Application Priority Data

Sep. 3, 1997 (DE) .............................................. 197 38 456

(51) Int. Cl.[7] .................................................. B23B 27/22
(52) U.S. Cl. .......................... 407/114; 407/115; 407/116; 407/23
(58) Field of Search ................. 407/23, 24, 25, 407/114, 115, 116

(56) References Cited

U.S. PATENT DOCUMENTS

| | | | |
|---|---|---|---|
| 4,131,383 | * 12/1978 | Powers | 407/114 |
| 4,218,159 | * 8/1980 | Langen | 407/25 |
| 4,278,373 | * 7/1981 | Wolfe, III | 408/188 |
| 4,669,925 | 6/1987 | Lowe et al. | |
| 4,681,487 | * 7/1987 | Pettersson | 407/114 |
| 4,993,892 | * 2/1991 | Takahashi | 407/114 |

FOREIGN PATENT DOCUMENTS

| | | |
|---|---|---|
| 2254026 | 9/1992 | (GB) . |
| 9507159 | 3/1995 | (WO) . |

OTHER PUBLICATIONS

Catalog excert "Iscarthread" 1982.

* cited by examiner

Primary Examiner—Henry Tsai
(74) Attorney, Agent, or Firm—Nils H. Ljungman & Associates

(57) ABSTRACT

A screwing plate or thread cutting bit comprising at least one cutting tip whose contour matches the desired shape of the threading. The cutting tip is configured as a chip forming element which is shaped in the form of a spur located between both sides of the cutting faces. The chip forming element rises above the cutting faces more or less in the form of a table mountain. The flanks of the spur, which are slanted in the form of inclined walls, are spaced at different distances from the adjacent cutting edges so as to form cutting faces with differing widths.

17 Claims, 6 Drawing Sheets

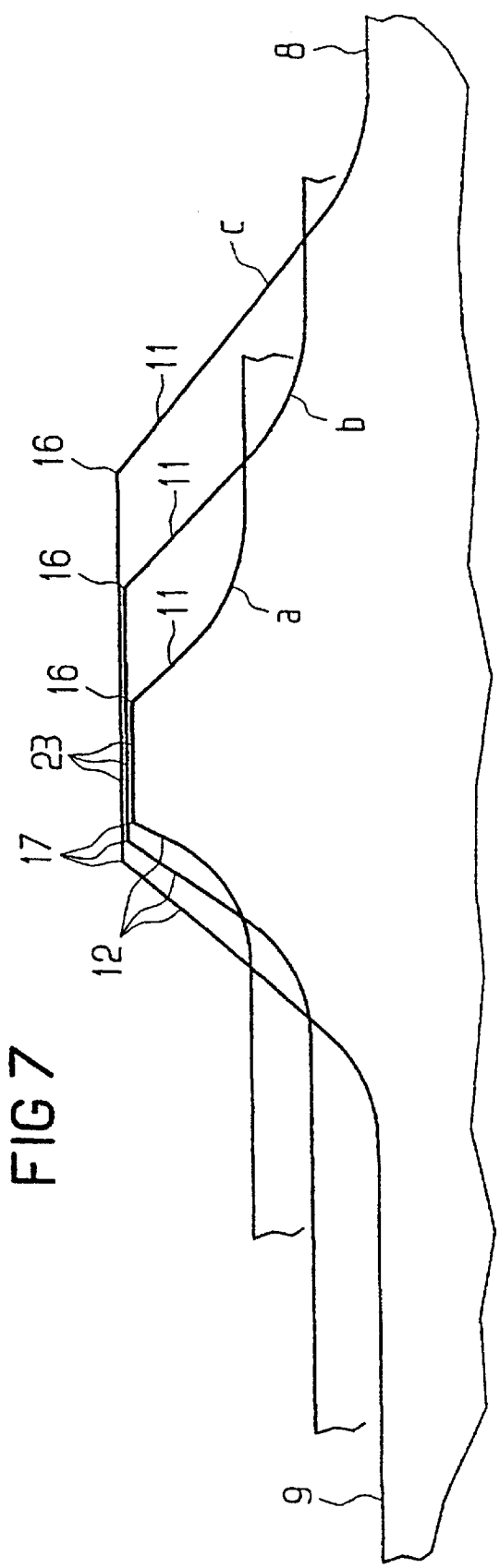

THREAD CUTTING BIT

CONTINUING APPLICATION DATA

This application is a Continuation-In-Part application of International Application No. PCT/EP98/05078, filed on Aug. 11, 1998, which claims priority from Federal Republic of Germany Patent Application No. 197 38 456.0, filed on Sep. 3, 1997. International Application No. PCT/EP98/05078 was pending as of the filing date of the above-cited application. The United States was an elected state in International Application No. PCT/EP98/05078.

BACKGROUND OF THE INVENTION

1. Field of the Invention:

The present invention relates to a thread cutting bit made of a carbide cutting material with a bearing face and a cover face essentially parallel to it, as well as with at least one face edge or cutting corner which, depending on the type of thread being cut, forms a profiled cutting tip, with cutting edges. Above the cutting faces is located a chip forming element with flanks, of which, in the manner of the steep walls of a spur or plateau, maintain a distance from the neighboring cutting edges that contain, enclose or includes the associated cutting faces. The term "spur" is used to provide a graphic description of the configuration of the chip forming element between the cutting faces located on a face edge or cutting corner. According to the "Brockhaus Enzyklopädie" [Brockhaus Encyclopedia] 1993, Volume 19, the geological feature called a "spur" is defined as a "projecting land form, generally steep-walled, in particular at the intersection between two deep valleys that intersect at an acute angle." A triangular thread cutting bit of the known art with three geometrically identical faces and having the generic characteristics as indicated above is disclosed in WO 95/07159.

2. Background Information

The purpose of the thread cutting bit of the known art is to control the shaping of the chip by means of the geometric configuration of the respective cutting face that is in the engaged position, so that shorter chips are formed. The purpose of this type of operation is to prevent a clogging of the chip flute, which is hazardous for the operator. Consequently, this thread-cutting bit of the known art can also be used in mass-production operations where it is not constantly monitored by operating personnel.

The invention is based on the knowledge that when threads are being cut using conventional cutting bits, the surface of a cutting face is provided with a chip shaping stage that is shaped at an angle. Generally, such cutting bits are perforated, disposable bits having a triangular shape with a cutting face shaped onto each corner in the form of a thread profile tooth. When threads are being cut with such cutting bits, because the cutting or feed parameters can change either very little or not at all, very stable ribbon or mingled-up chips with a V-shaped cross section are formed, which have a very disruptive effect on CNC drilling machines that are installed in very tight spaces, as well as on the fabrication process as a whole.

OBJECT OF THE INVENTION

The object of the present invention is to propose another solution to this problem encountered with thread cutting bits of the known art.

A further object of the present invention, in at least one possible embodiment, is to substantially reduce clogging of the chip flute when different cutting or feed parameters are used.

SUMMARY OF THE INVENTION

The object of the present invention can be achieved in a substantially spur-shaped chip forming element that can project beyond the cutting faces in the manner of a table mountain or plateau, where the distance from each of the chip-forming element's flanks to the cutting edges is different, forming a broader cutting face on one side and a narrower cutting face on the other side. The present invention teaches that the spur-shaped chip forming element can project beyond the faces in the manner of a table mountain or mesa or plateau. In this case, the term "table mountain" is used as another graphic description of the shape of the chip forming element claimed by the invention, and is also borrowed from geology. According to the "Brockhaus Enzyklopädie," Volume 21, 1993, the term "table mountain" is described as an "isolated, plateau-like form of mountain . . . with a surface that is generally flat like a table".

An essential characterizing feature of the object of the present invention that distinguishes it from the known art described above is that the distances between the flanks of the spur-shaped chip forming element and the profile of the cutting edge on both sides of the chip forming element are different. A broader cutting face can be formed on the one side of the chip forming element, and a narrower cutting face can be formed on the other side. This shape has been found to be particularly appropriate for working the thread cutting bit with varied or modified flank feeds when cutting threads.

When cutting threads, there are essentially three different types of feed of the thread cutting tooth. There is a radial feed, a feed along the flank of the thread cutting tooth, and a combination between these two types of feeds. This combination is designated a "modified or altered flank feed" (see the applicant's promotional brochure 602.00 D entitled "Gewindedrehen", or the English-language edition entitled "Threading", 602.00 GB, page 39 in both versions). When the thread cutting bit of the present invention with modified or altered flank feed is used, the cutting edge of each cutting tip provided with the broader cutting face on the flank side that lies in the feed direction can be larger than the cutting edge on the flank side facing away from the feed direction. With a thread cutting bit designed as shown in at least one embodiment of the invention, and with a flank feed modified by approximately 3–5 degrees (see the applicant's brochure 602.00, page 39, left column in the figure with the title "Type of Feed", 3rd figure from the top), it is possible to achieve a substantially short chip length. In this case, it is assumed that the cutting and feed parameters have been determined optimally for the material in question. In one economically efficient realization, the thread cutting bit claimed by the invention can be a triangular bit with three identical cutting tips, somewhat analogous to WO 95/07159. This embodiment can also be realized in the form of a thread chasing tool, in which case it will have different thread profile shapes.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The cutting bit claimed by the present invention is explained in greater detail below with reference to the exemplary embodiment illustrated in the accompanying figures, in which:

FIG. 7 shows profile cross sections a–c, one behind the other, of the cutting tip along section planes VII—VII in FIG. 2.

DESCRIPTION OF THE PREFERRED EMBODIMENT

Figure 1:
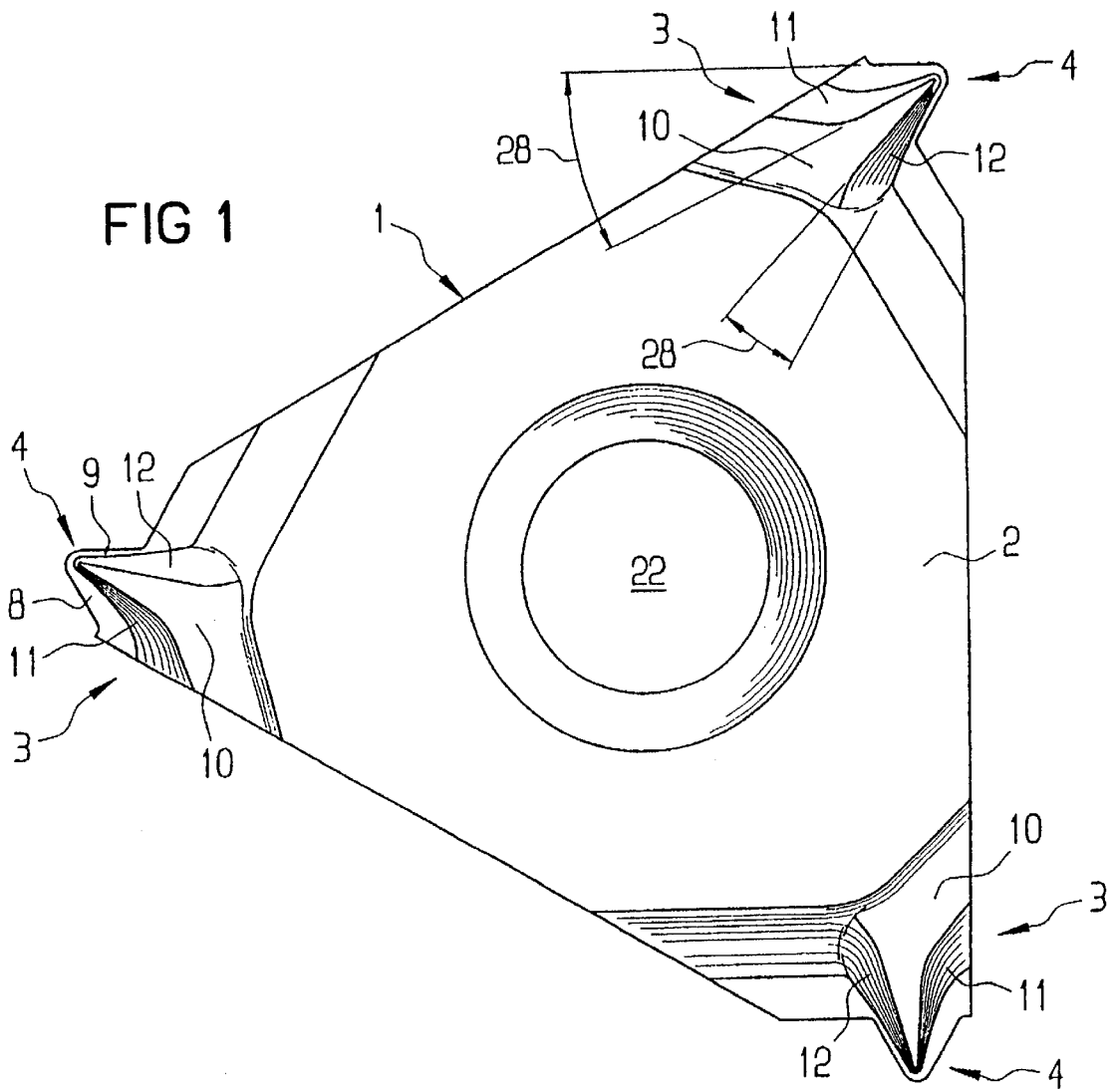
FIG. 1 is a plan view of a thread cutting bit realized in the form of a triangular bit.
Figure 3:
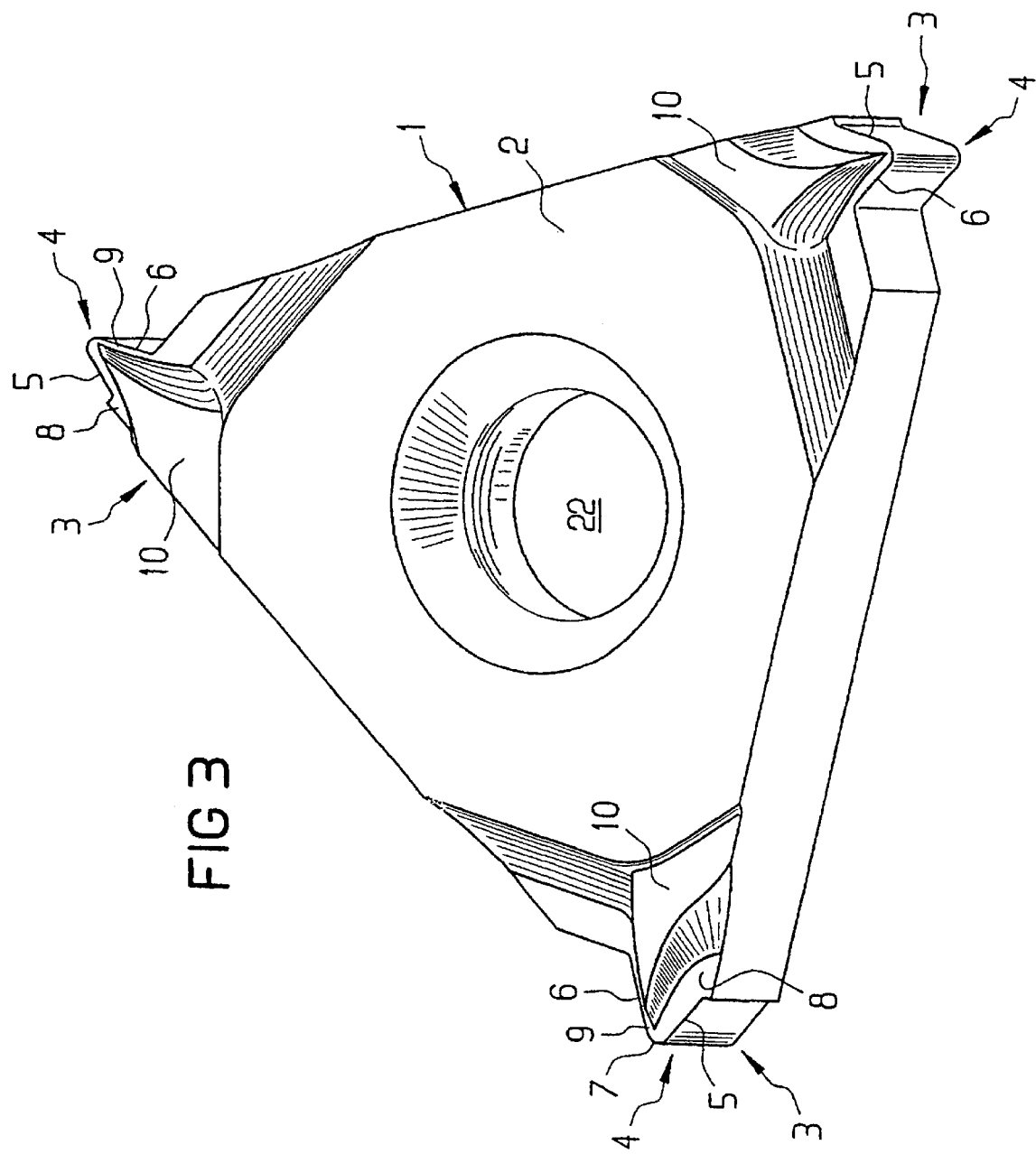
FIG. 3 is an overhead view in perspective of the cutting bit, analogous to FIG. 1.

The thread cutting bit 1 in the exemplary embodiment shown in FIGS. 1 and 3 is a triangular bit with three geometrically identical cutting tips 4 that can be successively brought into the cutting position by rotating the cutting bit 1 in a holder. The thread cutting bit can be made of carbide cutting material and has a bearing face as well as a cover face 2 that is essentially parallel to the bearing face. The cutting tips 4, which are profiled to correspond to the shape of the thread, project out of the face edges 3. In the shape of the legs of a V, they form outwardly convergent cutting edges 5, 6 with a rounded angle point cutting edge 7 lying between them. The geometric shape of this cutting tip 4 is the focus of the invention. The supports on which these cutting tips 4 are located can be realized in different ways. In this case, the cutting bit is in the shape of a triangle.

Figure 4:
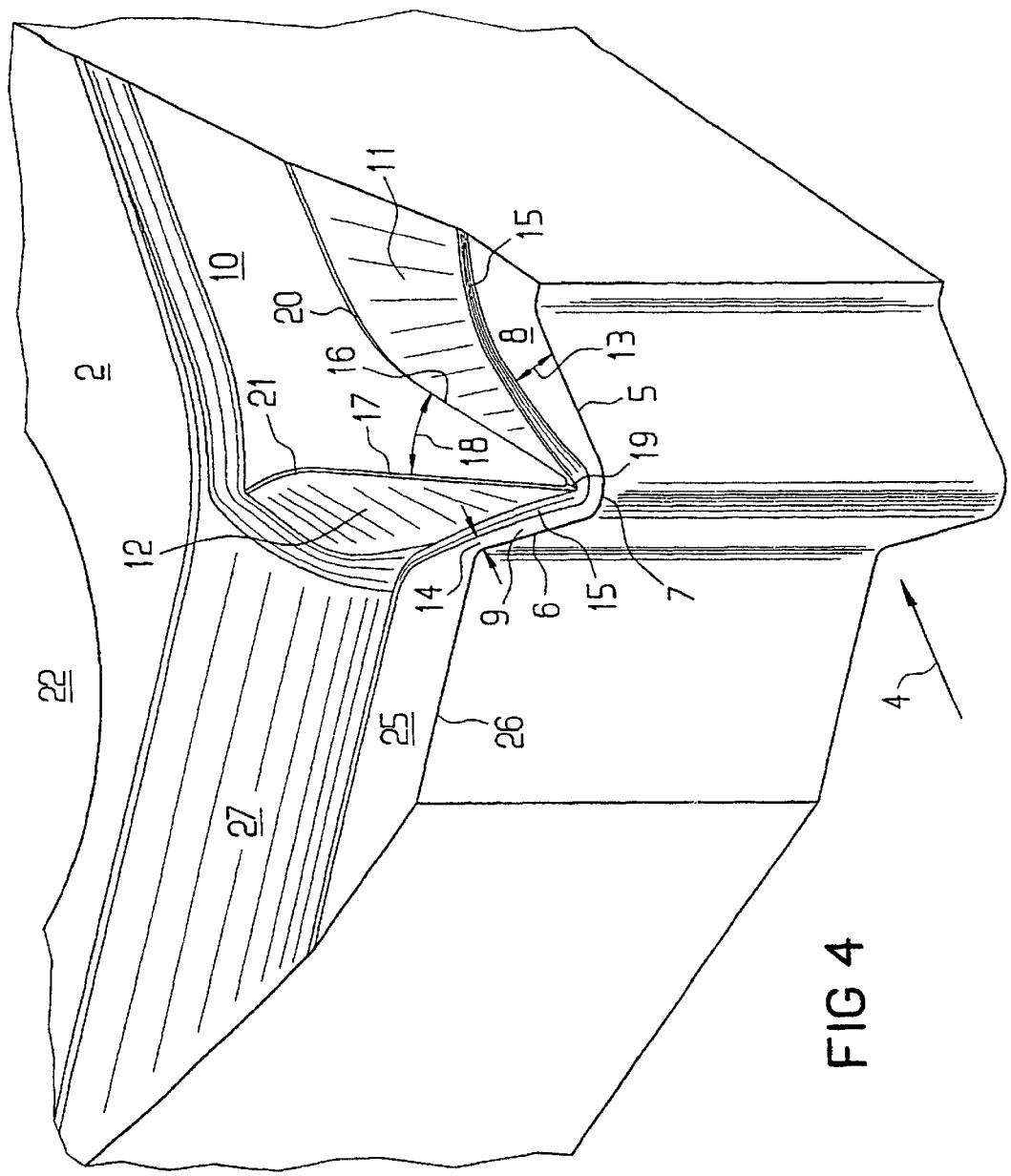
FIG. 4 is an enlarged view in perspective of one face edge of the thread cutting bit.

Above the cutting faces 8, 9 of the cutting edges 5, 6 of the cutting tip 4 is a chip forming element 10 that converges toward the cutting tip 4 or the angle point cutting edge 7 in the manner of a spur or plateau. Its flanks 11, 12, which fall off at an angle in the manner of the steep walls of a spur, are at different distances from the neighboring cutting edges 5, 6, and accordingly form cutting faces 8, 9 of different widths. The cutting edge 5 provided with the wider cutting face 8 is associated with that flank side of the cutting tip 4 that lies in the feed direction of the modified flank feed. The direction of the distance is identified by the reference numbers 13, 14 in FIG. 4.

The flank 12 of the chip forming element 10 that faces the narrower cutting face 9 is inclined at a greater angle than the flank 11 that faces the wider cutting face 8. Preferably, the two flanks 11, 12 are formed essentially by planes in the vicinity of the cutting tip 4. Accordingly, the flank 12 of the chip forming element 10 that faces the narrower cutting face 9 encloses a larger angle of inclination with the adjacent cutting face 9 than the other flank 11 with the other cutting face 8. The transition of the flanks 11, 12 of the chip forming element 10 into the corresponding cutting faces 8, 9 is rounded. The rounded portions are identified by the reference number 15.

Figure 2:
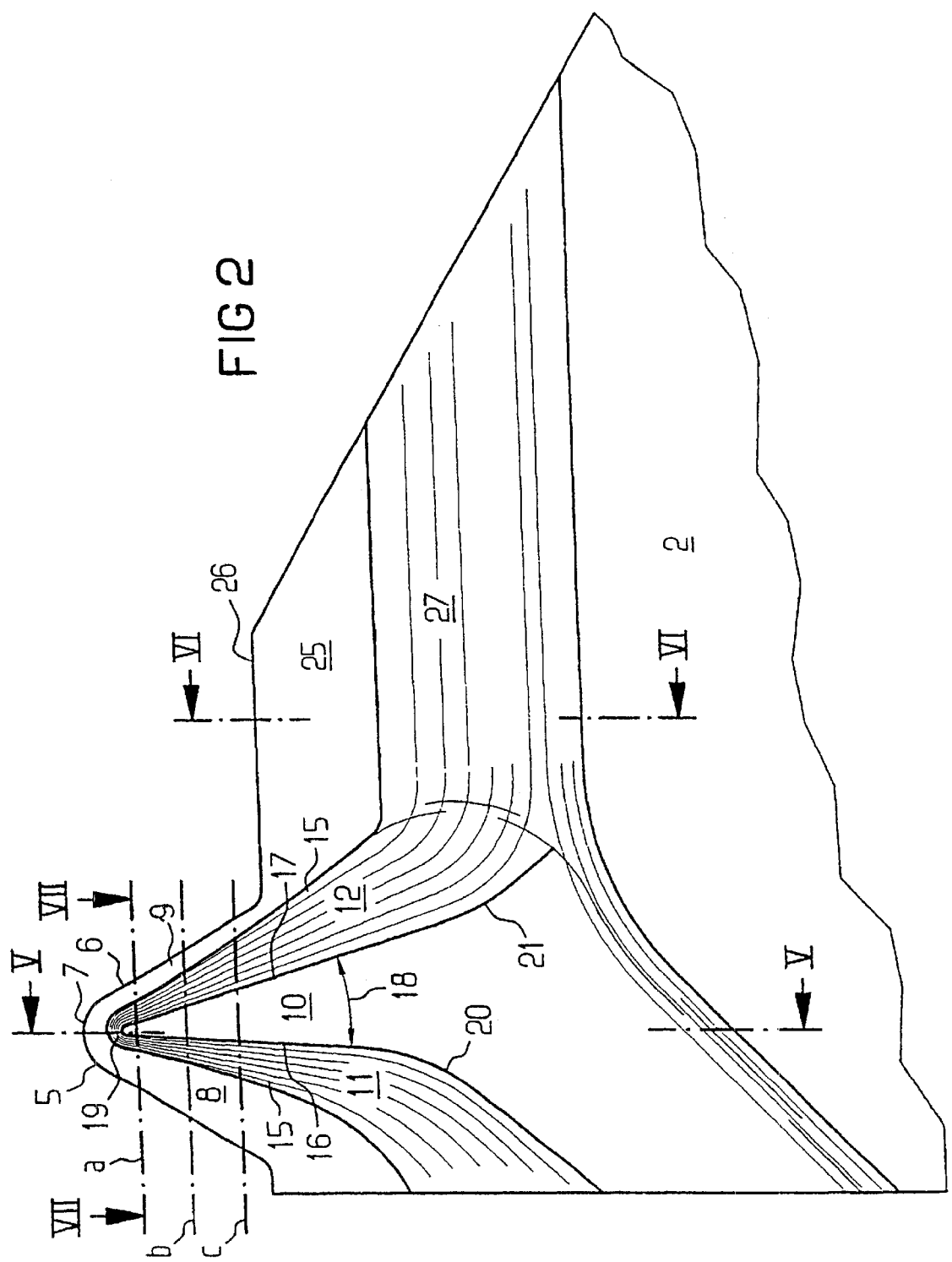
FIG. 2 is an enlarged plan view of a face edge of the thread cutting bit, and with section planes that run in the longitudinal and transverse direction of the spur-shaped chip forming element, to illustrate the profile cross sections.
Figure 5:
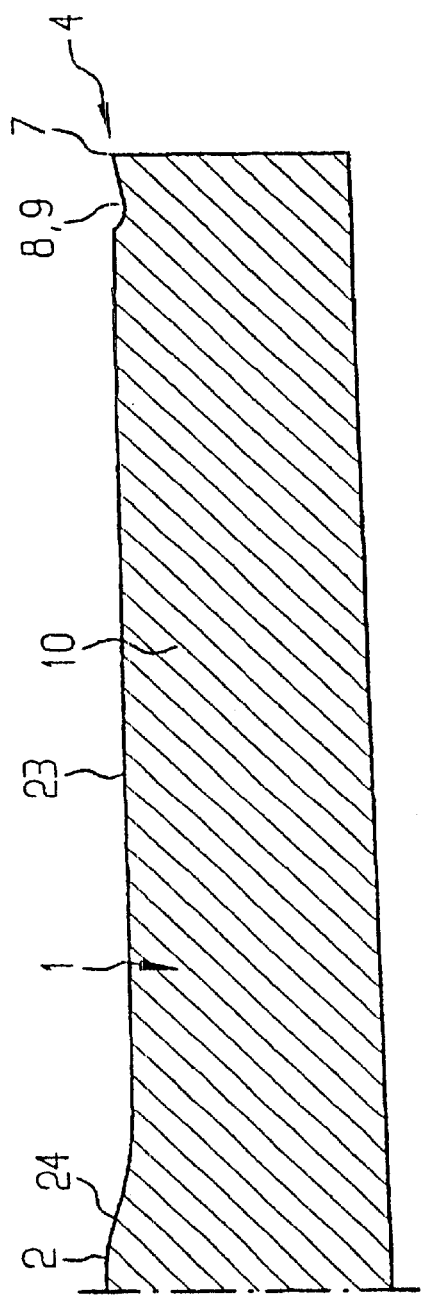
FIG. 5 is a partial profile cross section along Line V—V in FIG. 2, through the cutting tip.

The flank edges 16, 17 that form the transition from the plateau surface 23 (see FIGS. 5 and 7) of the chip forming element 10 to the flanks 11, 12 of the spur are straight, at least in the vicinity of the cutting tip 4. Between them, they form an acute angle 18, the apex area 19 of which is rounded, as shown in FIG. 2. The flanks 11, 12 of the spur diverge on their inner ends 20, 21 that are positioned at some distance from the cutting tip 4, 7 in a rounded shape, i.e. they are flared in the shape of a bell. The plateau surface 23 of the chip forming element 10 is inclined slightly upward on its outer end facing the cutting tip 4, 7 toward the cover face 2 or toward the middle of the cutting bit formed by a clamping hole 22. The longitudinal profile of the surface of the chip forming element 10 is illustrated in FIG. 5. The figure shows particularly clearly the slightly ascending shape of the plateau surface 23 of the chip forming element 10. In an overhead view, on its cover-face side, the plateau surface 23 ascends in its flared expanded areas beyond the ends 20, 21 of the straight-line flank edges 16, 17 into the cover face 2. This ascending area 24 is illustrated in the profile cross section shown in Figure S.

Figure 6:
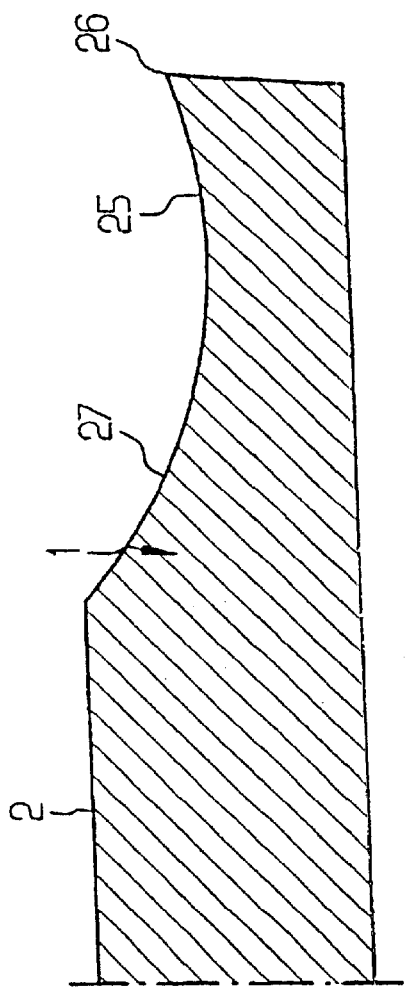
FIG. 6 is a partial profile cross section through the cutting edge of the thread cutting bit in an area near the cutting tip, along Line VI—VI in FIG. 2.

The profile cross section in FIG. 6 through the profile of the cutting edge, to the side of the cutting tip 4, shows a significantly widened cutting face 25 with a relatively large positive cutting angle and behind that, with increasing distance from the cutting edge 26, the chip forming area 27 that ascends to the cover face 2. The flanks 11, 12 of the chip forming element 10 in the flared area of the flank edges 16, 17 form concavely rounded transitional areas between the forward area of the cutting tip 4 and the rear base area, which in this exemplary embodiment is triangular in shape, of the thread cutting bit 1. The cutting angles of the cutting faces 8, 9 are also positive.

At least one of the flank edges 16, 17 of the chip forming element 10, when viewed from overhead, forms an acute angle 28 with the neighboring cutting edge 5 or 6.

The cutting faces 8, 9 in the vicinity of the cutting tip 4 and the adjacent cutting face 25 outside the cutting tip 4, as well as the level of the plateau surface 23 of the chip forming elements 10, are lower than the level of the cover face 2.

With reference to FIG. 7, the flanks 11, 12 have various angles of inclination or form angles with respect to their corresponding cutting faces 8, 9 at cross-sections a, b and c of the cutting tip along section planes VII—VII shown in FIG. 2. At cross-section a, the angle formed between the flank edge 11 and the cutting face 8 can be approximately 125, 126, 127, 128, 129, 130, 131, 132, 133, 134, 135, 136, 137, 138, 139, 140, 141, 142, 143, 144 or 145 degrees. At cross-section b, the angle formed between the flank edge 11 and the cutting face 8 can be approximately 126, 127, 128, 129, 130, 131, 132, 133, 134, 135, 136, 137, 138, 139, 140, 141, 142, 143, 144, 145 or 146 degrees. At cross-section c, the angle formed between the flank edge 11 and the cutting face 8 can be approximately 131, 132, 133, 134, 135, 136, 137, 138, 139, 140, 141, 142, 143, 144, 145, 146, 147, 148, 149, 150 or 151 degrees. At cross-section a, the angle formed between the flank edge 12 and the cutting face 9 can be approximately 120, 121, 122, 123, 124, 125, 126, 127, 128, 129, 130, 131, 132, 133, 134, 135, 136, 137, 138, 139 or 140 degrees. At cross-section b, the angle formed between the flank edge 12 and the cutting face 9 can be approximately 115, 116, 117, 118, 119, 120, 121, 122, 123, 124, 125, 126, 127, 128, 129, 130, 131, 132, 133, 134 or 135 degrees.

At cross-section c, the angle formed between the flank edge 12 and the cutting face 9 can be approximately 107, 108, 109, 110, 111, 112, 113, 114, 115, 116, 117, 118, 119, 120, 121, 122, 123, 124, 125, 126 or 127 degrees. Preferably, any one of the above angles will be between the range of 100–160 degrees. However, it is to be understood that the measurements listed above show possible angles of inclination for a preferred embodiment of the present invention and do not limit or prohibit the use of other angles of inclination not listed above in other possible embodiments of the present invention.

One feature of the invention resides broadly in the thread cutting bit 1 made of a carbide cutting material with a bearing face and a cover face 2 essentially parallel to it, as well as with at least one face edge or cutting corner 3 which, depending on the type of thread being cut, forms a profiled cutting tip 4, with cutting edges 5, 6 that together form: the legs of a V, or in general, a convex protrusion, or a shape that represents a combination of the above, above the cutting faces 8, 9 of which a chip forming element 10 projects in the manner of a spur that converges toward the cutting tips 4, 7, the inclined descending flanks 11, 12 of which, in the manner of the steep walls of a spur, maintain a distance from the neighboring cutting edges 5, 6 that contains, encloses or Includes the associated cutting faces 8, 9, characterized by the fact that the spur-shaped chip forming element 10 projects beyond the cutting faces 8, 9 in the manner of a table mountain and that the distance from each of its flanks to the cutting edges 5, 6 is different, forming a broader 8 and a narrower 9 cutting face on the two sides.

Another feature of the invention resides broadly in the cutting bit characterized by the fact that the flank 12 of the chip forming element 10 facing the narrower cutting face 9 is more steeply inclined than the flank 11 facing the wider cutting face 8.

Yet another feature of the invention resides broadly in the cutting bit characterized by the fact that the flank 12 of the chip forming element 10 facing the narrower cutting face 9 encloses a larger angle of inclination with the adjacent cutting face 9 than the other flank 11 with the other cutting face 8.

Still another feature of the invention resides broadly in the cutting bit characterized by a rounded transition of the flanks 11, 12 of the chip forming element 10 into the corresponding cutting faces 8, 9.

A further feature of the invention resides broadly in the cutting bit characterized by the fact that the spur-shaped chip forming element 10 does not project with the plateau surface 23 of its table mountain shape beyond the cover face 2.

Another feature of the invention resides broadly in the cutting bit characterized by the fact that the flank edges 16, 17 that form the transition from the plateau surface 23 of the chip forming element 10 to the spur flanks 11, 12 are straight, at least in the cutting tip area 4, and between them form an acute angle 19, the outer apex area 19 of which is rounded.

Yet another feature of the invention resides broadly in the cutting bit characterized by the fact that the spur flanks 11, 12 diverge, initially in a bell or flared shape, at their inner ends 20, 21 which are positioned at some distance from the cutting tip 4, 7.

Still another feature of the invention resides broadly in the cutting bit characterized by the fact that the plateau face 23 is inclined at a slight ascending angle inward from its outer end facing the cutting tip 4, 7.

A further feature of the invention resides broadly in the cutting bit characterized by the fact that the plateau face 23 ascends on its inner end, which expands in a bell shape when viewed from overhead, toward the cover face 2.

Another feature of the invention resides broadly in the cutting bit characterized by the fact that the flanks 11, 12 of the chip forming element 10 that are in the flared area of a flank edge 16, 17 form concave rounded transition areas between the outer cutting tip area 4 and the area of the cover face 2 of the thread cutter bit 1.

Yet another feature of the invention resides broadly in the cutting bit characterized by the fact that the cutting faces 8, 9 have a positive rake angle or cutting angle.

Still another: feature of the invention resides broadly in the cutting bit characterized by the fact that at least one of the flank edges 16, 17 of the chip forming element 10, when viewed from overhead, forms with the neighboring cutting edge 5, 6 an acute angle 28, the tip of which is toward the outside.

A further feature of the invention resides broadly in the cutting bit characterized by the fact that it has a plurality of face edges or cutting corners 3.

Another feature of the invention resides broadly in the cutting bit characterized by the fact that it is a triangular bit with three face edges 3 positioned in the corners of the bit.

Some examples of thread cutting devices and components thereof which may possibly be utilized or adapted for use in at least one embodiment of the present invention may be found in the following U.S. Patents: U.S. Pat. No. 6,019,552, issued on Feb. 1, 2000 to inventor Watzke; U.S. Pat. No. 6,012,882, issued on Jan. 11, 2000 to inventor Turchan; U.S. Pat. No. 5,924,825, issued on Jul. 20, 1999 to inventors Schwab, et al.; U.S. Pat. No. 5,915,892, issued on Jun. 29, 1999 to inventors Glimpel, et al.; U.S. Pat. No. 5,890,852, issued on Apr. 6, 1999 to inventor Gress; U.S. Pat. No. 5,873,684, issued on Feb. 23, 1999 to inventor Flolo; and U.S. Pat. No. 5,846,033, issued on December 8, 1998 to inventor Biberman.

Some examples of CNC devices and components thereof which may possibly be utilized or adapted for use in at least one embodiment of the present invention may be found in the following U.S. Patents: U.S. Pat. No. 5,918,514, issued on Jul. 6, 1999 to inventors Crudgington, et al.; U.S. Pat. No. 5,765,456, issued on Jun. 16, 1998 to inventor Grossman; U.S. Pat. No. 5,676,030, issued on Oct. 14, 1997 to inventors Crudgington, et al.; U.S. Pat. No. 5,239,901, issued on Aug. 31, 1993 to inventor Lin; and U.S. Pat. No. 5,182,974, issued on Feb. 2, 1993 to inventors Cudini, et al.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 197 38 456.0, filed on Sep. 3, 1997, having inventors Rudi Hartlohner and Hermann Prokop, and DE-OS 197 38 456.0 and DE-PS 197 38 456.0, and International Application No. PCT/EP98/05078 filed on Aug. 11, 1998, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

AT LEAST PARTIAL NOMENCLATURE:

1. Thread cutting bit
2. Cover face
3. Face edge
4. Cutting tip
5. Cutting edge
6. Cutting edge
7. Angle point cutting edge
8. Cutting face
9. Cutting face
10. Chip forming element
11. Flank of the chip forming element
12. Flank of the chip forming element
13. Distance
14. Distance
15. Rounding
16. Flank edge
17. Flank edge
18. Acute angle
19. Apex area
20. Flared end
21. Flared end
22. Clamping hole
23. Plateau face
24. Ascending area
25. Cutting face
26. Cutting edge
27. Chip forming area

What is claimed is:

1. Thread cutting bit to cut thread in a material, said thread cutting bit comprising:

a cover face;
a bearing face;
at least one cutting tip being configured and disposed to cut a thread in a material; and
said cutting tip comprising:
    a first cutting edge and a second cutting edge being disposed at an angle to each other to cut a thread having a predetermined thread configuration and being configured to cut at both said first cutting edge and said second cutting edge simultaneously and further configured to form chips having a v-shaped cross section;
    a first cutting face and a second cutting face being disposed to permit said first cutting edge and said second cutting edge to cut a thread having said predetermined thread configuration;
    said first cutting face being disposed adjacent to said first cutting edge;
    said second cutting face being disposed adjacent to said second cutting edge;
    a projection being configured and disposed to project out and away from said cutting faces;
    said projection being configured to shape chips;
    said projection having a first side flank and a second side flank;
    each of said first side flank and said second side flank having a base portion;
    said base portion of said first side flank being disposed adjacent to said first cutting face;
    said base portion of said first side flank being disposed opposite said first cutting edge;
    said base portion of said second side flank being disposed adjacent to said second cutting face;
    said base portion of said second side flank being disposed opposite said second cutting edge;
    each of said first cutting face and said second cutting face having a width, each width being the distance between the corresponding base portion and corresponding cutting edge of each of said first cutting face and said second cutting face; and
    said width of said first cutting face being substantially greater than said width of said second cutting face in order to substantially minimize the chip length of the cut material.

2. Thread cutting bit made of a carbide cutting material with a bearing face and a cover face essentially parallel to it, as well as with at least one face edge or cutting corner which, depending on the type of thread being cut, forms a profiled cutting tip with cutting edges that together form:

a pair of joined legs and being configured in the shape of a V and disposed at an angle to each other to cut a thread having a predetermined thread configuration and being configured to cut at both said first cutting edge and said second cutting edge simultaneously and further configured to form chips having a v-shaped cross section;

in general, a convex protrusion, or a shape that represents a combination of the above and converges toward the cutting tips above the cutting faces of which a chip forming element projects in the manner of a spur that converges toward the cutting tips thus forming a pair of flanks and each of said flanks inclining and descending toward each of said respective cutting edges in a manner that corresponds to the steep walls of the spur thus maintaining a distance from the neighboring cutting edges that contains, encloses or includes the associated cutting faces so that the spur-shaped chip forming element projects beyond the cutting faces in the manner of a table mountain thereby providing a distance from each of said flanks to each of said neighboring cutting edges that is different and thus forming one broader cutting face and one narrower cutting face adjacent to each of the respective flanks in order to substantially minimize the chip length of the cut material.

3. Cutting bit as claimed in claim 2, characterized by the fact that the flank of the chip forming element facing the narrower cutting face is more steeply inclined than the flank facing the wider cutting face.

4. Cutting bit as claimed in claim 3, characterized by the fact that the flank of the chip forming element facing the narrower cutting face encloses a larger angle of inclination with the adjacent cutting face than the other flank with the other cutting face.

5. Cutting bit as claimed in claim 2, characterized by a rounded transition of the flanks of the chip forming element into the corresponding cutting faces.

6. Cutting bit as claimed in claim 2, wherein the chip forming element includes a plateau surface having a height that is not greater than the cover face.

7. Cutting bit as claimed in claim 6, further comprising a pair of flank edges that form a transititon zone between said plateau surface of said chip forming element and each of said flanks, said flank edges being straight adjacent said cutting tip and including an outer apex area adjacent said cutting tip that is rounded and said flank edges forming an acute angle between each other.

8. Cutting bit as claimed in claim 7, characterized by the fact that the spur flanks diverge, initially in a bell shape, at their inner ends which are positioned at some distance from the cutting tip.

9. Cutting bit as claimed in claim 7, characterized by the fact that the plateau face is inclined at a slight ascending angle inward from its outer end facing the cutting tip.

10. Cutting bit as claimed in claim 8, characterized by the fact that the plateau face is inclined at a slight ascending angle inward from its outer end facing the cutting tip.

11. Cutting bit as claimed in claim 10, characterized by the fact that the plateau face ascends on its inner end, which expands in a bell shape when viewed from overhead, toward the cover face.

12. Cutting bit as claimed in claim 8, characterized by the fact that the flanks of the chip forming element that are in the flared area of a flank edge form concave rounded transition areas between the outer cutting tip area and the area of the cover face of the thread cutter bit.

13. Cutting bit as claimed n claim 2, characterized by the fact that the cutting faces have a positive rake angle or cutting angle.

14. Cutting bit as claimed in claim 2, characterized by the fact that at least one of the flank edges of the chip forming element, when viewed from overhead, forms with the neighboring cutting edge an acute angle, the tip of which is toward the outside.

15. Cutting bit as claimed in claim 2, characterized by the fact that it has a plurality of face edges or cutting corners.

16. Cutting bit as claimed in claim 2, characterized by the fact that it is a triangular bit with three face edges positioned in the corners of the bit.

17. Thread cutting bit to cut a thread in a material, said thread cutting bit comprising:

at least one cutting bit being configured and disposed to cut a thread in the material; and said cutting tip comprising:

a first cutting edge and a second cutting edge being disposed at an angle to each other to cut a thread having a predetermined thread configuration and being configured to cut at both said first cutting edge and said second cutting edge simultaneously and further configured to form chips having a v-shaped cross section;

a first cutting face and a second cutting face being disposed to permit said first cutting edge and said second cutting edge to cut a thread having said predetermined thread configuration;

said first cutting face being disposed adjacent to first cutting edge;

said second cutting face being disposed adjacent to said second cutting edge;

each of said first cutting face and said second cutting face comprising:

a first surface being configured to shape chips cut from its corresponding cutting edge;

a second surface;

said first surface being disposed adjacent to said second surface;

a transition zone being disposed between said first surface and said second surface;

said second surface being disposed between said transition zone and a corresponding one of said cutting edges; and said second surface having a width, said width being the distance between said transition zone and the corresponding one of said cutting edges; and said width of said first surface of said first cutting face being greater than said width of said second surface of said second cutting face in order to substantially minimize the chip length of the cut material.

* * * * *